(12) United States Patent
Naamad et al.

(10) Patent No.: US 7,406,574 B1
(45) Date of Patent: Jul. 29, 2008

(54) MANAGEMENT OF INVALID TRACKS

(75) Inventors: Amnon Naamad, Brookline, MA (US);
Yechiel Yochai, Brookline, MA (US);
Sachin More, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 1248 days.

(21) Appl. No.: 10/081,682

(22) Filed: Feb. 25, 2002

(51) Int. Cl.
*G06F 12/06* (2006.01)
(52) U.S. Cl. ................................ 711/156; 711/148
(58) Field of Classification Search ................ 711/112, 711/113, 111, 148, 156
See application file for complete search history.

(56) References Cited

U.S. PATENT DOCUMENTS

| | | | |
|---|---|---|---|
| 5,544,347 A | | 8/1996 | Yanai et al. ............... 395/489 |
| 5,815,656 A | * | 9/1998 | Candelaria et al. ........... 714/54 |
| 5,948,059 A | * | 9/1999 | Woo et al. ................. 709/206 |
| 6,539,462 B1 | * | 3/2003 | Mikkelsen et al. .......... 711/162 |

* cited by examiner

*Primary Examiner*—Pierre-Michel Bataille
(74) *Attorney, Agent, or Firm*—Fish & Richardson P.C.

(57) ABSTRACT

A method for implementing the invention is carried out in a data-storage system having a data storage unit that includes at least two constituent data storage elements. Each of the constituent data storage elements is either in a first state or a second state. The method includes providing a data structure having an entry corresponding to the data storage unit. The entry includes status information indicating whether at least one constituent data storage element of the data storage unit is in the first state. These entries are updated as necessary following any changes in state of the constituent data storage element. Scanning the data storage units instead of the data storage elements provides a more efficient way to locate data storage elements in the first state, particularly where such data storage elements are rare.

48 Claims, 7 Drawing Sheets

```
    procedure found_invalid_track(T)
100 ⎡ O = (T/15)/8
    ⎣ B = remainder(remainder(T/15)/8
      X = pointer to bitmap
102 — lock bitmap
104 — D = byte at offset O from X
      if (bit B of D) = 0 then
106 — set (bit B of D) = 1;
108 — write D at offset O from X
      endif
110 — unlock bitmap
```

FIG. 5

```
procedure fixed_invalid_track(T)
    O = (T/15)/8
    B = remainder(remainder(T/15)/8
    X = pointer to bitmap
114—lock bitmap
116—D = byte at offset O from X
    if (bit B of D) = 1 then
117—     count = 15
         for each track T1 in cylinder containing track T do
118—         if T1 is valid then
119—             count=count-1
             endif
         endfor
120—     if count=0 then
121—         set (bit B of D) = 0
122—         write D at offset O from X
         endif
     else
124—     trace error
     endif
123—unlock bitmap
```

FIG. 6

```
procedure find_next_invalid_track(T)
T = last invalid track
X = pointer to bitmap
T1 = remainder(T+1)/n_tracks
repeat
    O=(T1/15)/8
    D=byte at offset O from X
    if D≠0 then
        for each bit B1 in D do
            if bit B1=1 then
                for each track T2 in cylinder containing T1 do
                    if T2 is invalid then
                        return T2
                    endif
                endfor
            endif
            T1 = remainder((T1+15)/n_tracks)
        endfor
    else
        T1=remainder((O*15*8+remainder(T1/15))/n_tracks)
    endif
until T1=T;
return -1.
```

FIG. 7

MANAGEMENT OF INVALID TRACKS

FIELD OF INVENTION

This invention relates to data-storage systems, and in particular, to the management of invalid tracks in a data-storage system.

BACKGROUND

In a data-storage system, data is stored in logical volumes that are divided into cylinders, each of which includes several constituent tracks. In some cases, a data error may cause data on a particular track to become invalid. Whenever a track becomes invalid, it must be marked as such, both to prevent the data-storage system from relying on any data in that track and to draw attention to that track so that the data contained therein can be corrected or replaced.

A conventional data-storage system maintains a track table in which there exists an entry for each track. Each track table entry includes an invalid bit. A set invalid bit indicates that data in the corresponding track is invalid. Conversely, a clear invalid bit indicates that data in the corresponding track is valid. In normal operation, only a few isolated track table entries have a set invalid bit; the overwhelming majority of track table entries have clear invalid bits.

A repair process executing as a background task periodically scans the track table to identify any track table entries having set invalid bits. When the repair process encounters such an entry, it initiates corrective action, the nature of which depends on details of the configuration of the data-storage system.

In another application, a data-storage system configured to mirror data uses the invalid bit to trigger a mirroring event in which data is copied from a primary storage location to a mirror device. In such a system, whenever a change is made to a track, the invalid bit for that track is set. A copy process periodically scans the track table to identify any track table entries having invalid bits. If the copy process encounters such a track table entry, it recognizes the track as having data that must be copied to the mirror device.

Since track table entries having invalid bits are so few and far between, the repair process spends an inordinate amount of its time scanning the track table looking for something to repair. This is an inefficient use of system resources. In addition, this lengthens the time during which a track holds invalid data as well as the time during which data on the primary storage location and on its mirror are different.

SUMMARY

The invention is based on the recognition that savings in time and system resources can be achieved by distilling status information concerning elementary data storage elements into status information concerning a data storage unit that includes two or more such data storage elements. In the implementation described herein, the data storage unit is the cylinder and the data storage element is a track. However, any grouping of data storage elements into data storage units is within the scope of the invention.

A method for implementing the invention is carried out in a data-storage system having a data storage unit that includes at least two constituent data storage elements. In one practice, the data storage unit corresponds to a cylinder and the data storage elements correspond to constituent tracks of the cylinder. However, any convenient element of data can be grouped into a larger data storage unit that includes several of those elements.

Each of the constituent data storage elements is either in a first state or a second state. The method includes providing a data structure having an entry corresponding to the data storage unit. The entry includes status information indicating whether at least one constituent data storage element of the data storage unit is in the first state. These entries are updated as necessary following any changes in state of the constituent data storage element.

In one practice of the invention, the data storage element is in its first state when there is invalid data stored therein. However, the invention does not depend on the meanings assigned to the first state and second states. Nor does it require that there only be two possible states.

In one practice of the invention, updating the entry includes identifying an entry in the data structure corresponding to a data storage unit that includes a constituent data storage element in its first state, and modifying status information in that entry to indicate that the data storage unit includes at least one constituent data storage element in the first state. To avoid race conditions, the data structure is optionally locked before modifying status information and unlocked after modifying status information.

In another practice of the invention, modifying status information includes inspecting the status information to determine if it already indicates that at least one constituent data storage element is in the first state.

In another practice of the invention, updating the entry includes, after detecting that a constituent data storage element is in the second state, determining whether the data storage unit contains any constituent data storage element in the first state, identifying an entry in the data structure corresponding to a data storage unit that includes the constituent data storage element, and modifying status information in the entry to indicate that no constituent data storage elements of the data storage unit are in the first state.

In one practice of the invention, providing a data structure includes providing a bit map having a plurality of bits, each of which corresponds to a cylinder. Each bit has a first state and a second state. The first state indicates that there exists at least one invalid track in the cylinder. The second state indicates that there are no invalid tracks in the cylinder.

One practice of the invention includes scanning the data structure to locate constituent data storage elements in the first state. In one implementation, scanning the data structure includes detecting an entry in the data structure that indicates the presence, in the data storage unit associated with the data structure, of at least one constituent data storage element in the first state. Following such detection, this implementation includes scanning constituent data storage elements included in the data storage unit to identify the constituent data storage element in the first state.

These and other features and advantages of the invention will be apparent from the following detailed description and the accompanying figures, in which:

BRIEF DESCRIPTION OF THE FIGURES

FIGS. 5-7 are pseudocoded implementations of the methods illustrated in FIGS. 2-4.

DETAILED DESCRIPTION

Figure 1:
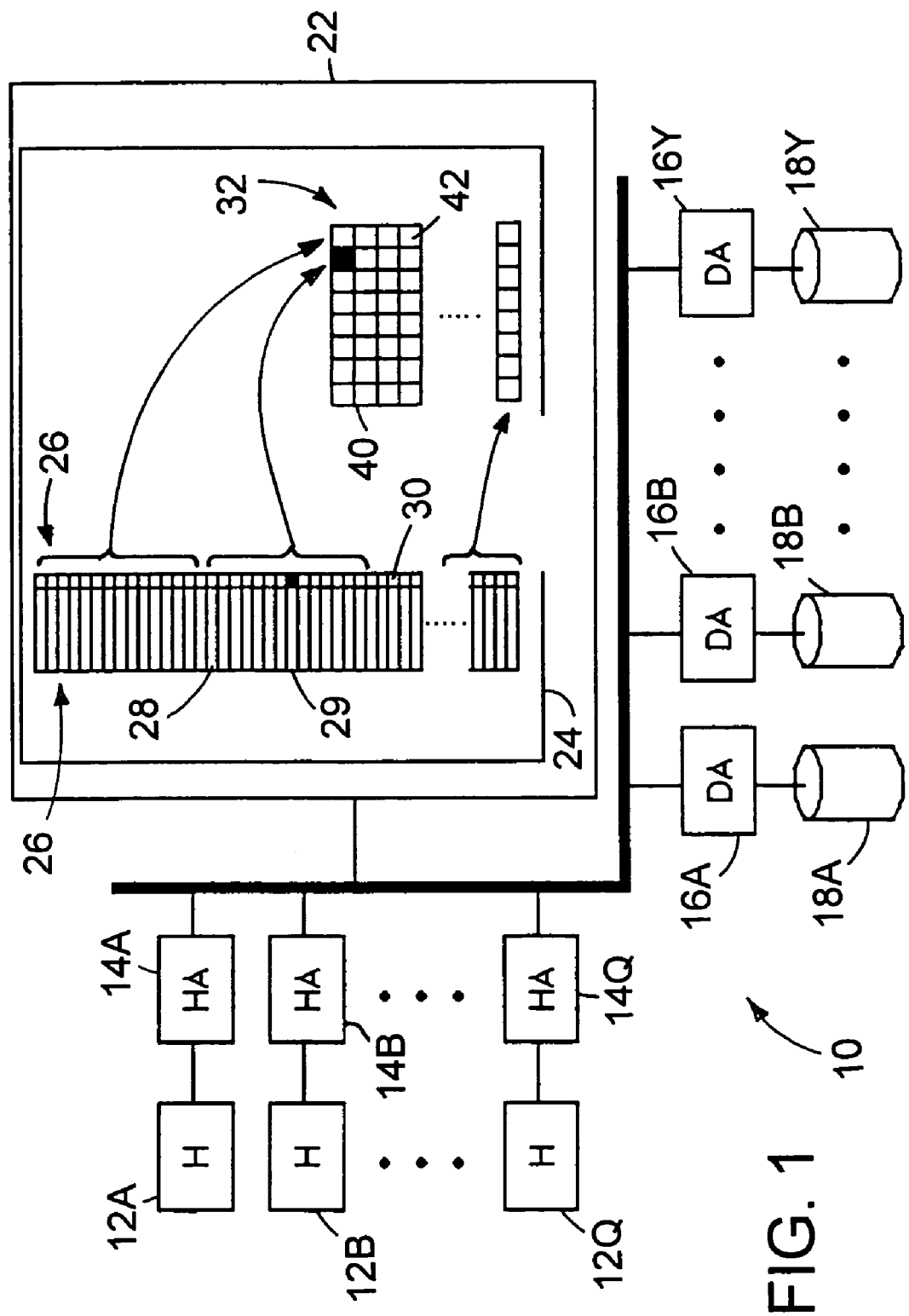
FIG. 1 shows a data-storage system having a bitmap maintained in a shared memory.

Referring to FIG. 1, a data-storage system 10 for serving the storage needs of several hosts 12A-Q includes several host adaptors 14A-Q, each of which is in communication with a host 12A-12Q, and several disk adaptors 16A-Y, each of which controls a disk subsystem 18A-Y on which data is stored. Each disk subsystem 18A-Y includes one or more disks, each of which is connected to a SCSI bus associated with a disk adaptor 16A-Y. Each host adaptor 14A and each disk adaptor 16A includes its own processor and local memory. Hence, the host adaptors 14A-Q and disk adaptors 16A-Y can be viewed as independent processing elements.

The host adaptors 14A-Q and the disk adaptors 16A-Y share one or more buses 20 for communicating with a global memory 22. By caching data in global memory 22, the data-storage system 10 postpones high latency operations, such as disk access, and thereby enhances a host's perception of performance. The global memory 22 also includes metadata 24 used for managing the operation of the data-storage system 10. This metadata 24 is shared among the host adaptors 14A-Q and the disk adaptors 16A-Y.

Figure 2:
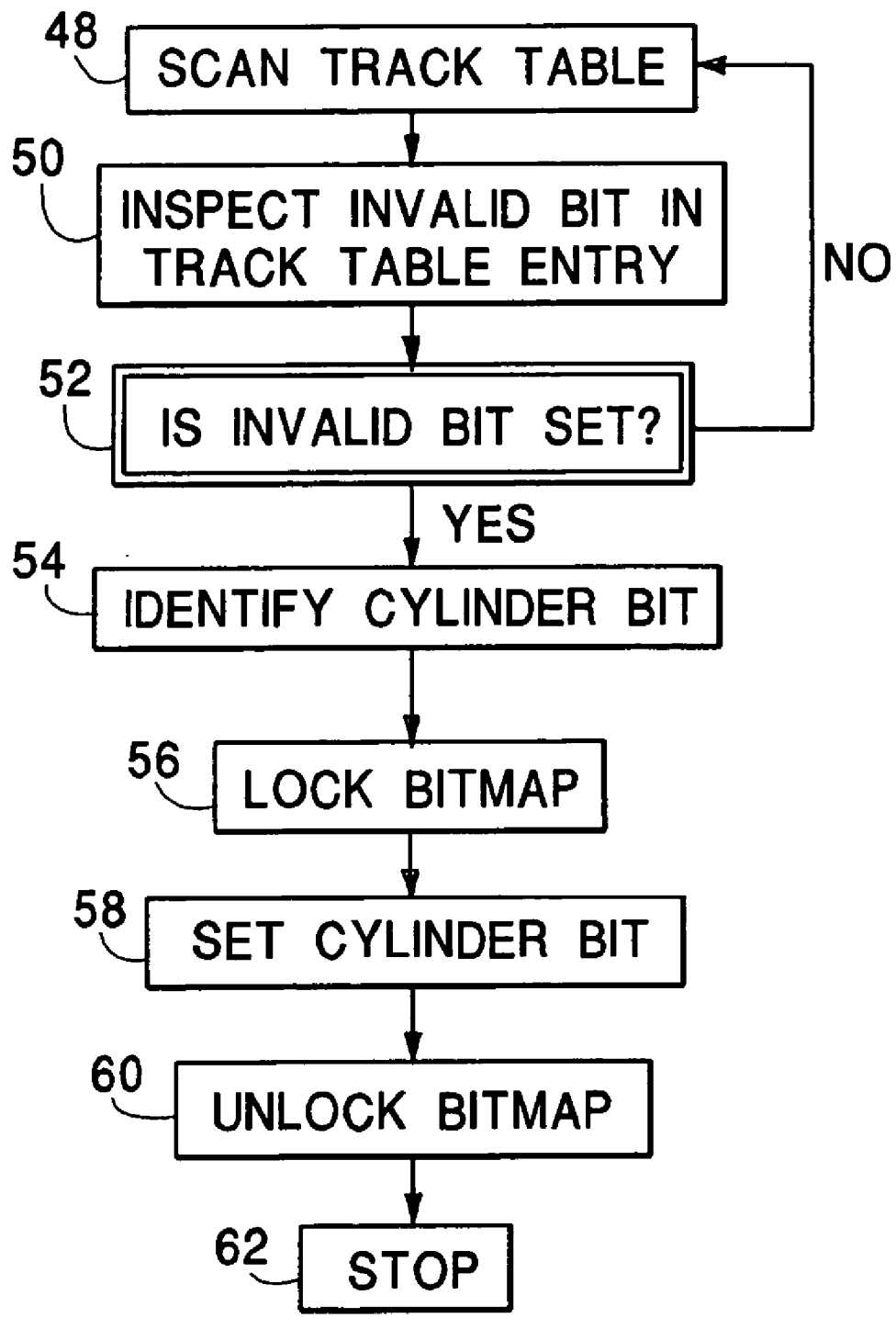
FIG. 2 is a flow-chart of a process for setting a cylinder bit in the shared memory of FIG. 1 following identification of an invalid track.

Included in this metadata 24 is a track table 26, depicted in FIG. 2. The track table 26 contains an entry, hereafter referred to as a "track-table entry 28", for each track on each disk in the data-storage system 10. The track-table entry 28 for a particular track indicates, among other things, whether a copy of that track exists in the global memory 22, and whether a copy of the track in global memory 22 needs to be copied to the disk that contains that track.

In some cases, data contained in a track can become corrupted. Corrupted data can be detected by, for example detecting an inconsistency in the CRC data for that track. When corrupted data is detected in a track, the track is flagged. For this purpose, each track-table entry 28 includes an invalid bit 30 that is set when the corresponding track includes corrupted data. A track-table entry 29 having a set invalid bit 30 shall be referred to herein as an "invalid-track entry 29". The track that corresponds to an invalid-track entry 29 shall be referred to herein as an "invalid track".

Each disk adaptor 16A periodically executes a repair utility as a background task. The repair utility searches for invalid tracks and, upon encountering an invalid track, performs some action. In doing so, the repair utility must access the track table 26 to search for invalid-track entries 29. Each access to the track table 26 requires access to global memory 22, which in turn requires the disk adaptor 16A to contend for bus access. To the extent that the disk adaptor 16A uses a bus 20 to inspect the track table 26 in global memory 22, other processes cannot use that bus 20. Because the disk adaptors 16A and the host adaptors 14A all contend for bus access, and because there are many fewer buses 20 than there are either disk adaptors 16A or host adaptors 14A, it is likely that a disk adaptor 16A will have to wait for bus access.

In normal operation, there are very few invalid tracks. As a result, any invalid-track entries 29 in the track table 26 are few and far between. To enable the repair utility to identify invalid-track entries 29 with fewer accesses to global memory 22, the data-storage system 10 maintains a data structure 32 having a plurality of elements, each of which corresponds to a set of tracks. Since each element corresponds to a set of tracks, the number of elements in the data structure 32 is less than the number of track-table entries.

Each element of the data structure 32 can be in one of two states. An element is in its first state only when there exists at least one invalid track within the set of tracks identified by that element. An element is in its second state when there are no invalid tracks in the set of tracks identified by that element.

In one embodiment, the set of tracks identified by an element in the data structure 32 is a contiguous set of tracks. A convenient choice for a set of tracks is the set of fifteen contiguous tracks referred to as a cylinder on a disk.

A suitable data structure 32 is a bitmap 40 in which each constituent bit, hereafter referred to as a cylinder bit 42, represents one cylinder. A cylinder bit 42 is set if its corresponding cylinder includes at least one invalid track. In all other cases, the cylinder bit 42 is clear.

Maintenance of the bitmap requires that a cylinder bit be set whenever a track in that cylinder contains invalid data. FIG. 2 shows a procedure to be used for updating the track-table entries whenever an invalid bit is set. Following the setting of an invalid bit associated with a track (step 52), the cylinder bit that corresponding to that track is identified (step 54). The bitmap is then locked to prevent any race condition from occurring (step 56) and the appropriate cylinder bit is set if necessary (step 58). Finally the bitmap is unlocked (step 62). The procedure then stops after the last track-table entry has been processed (step 62).

Maintenance of the bitmap also requires that a cylinder bit be cleared once all tracks on the cylinder bit's associated cylinder contain valid data. However, before a repair utility can clear a cylinder bit, it must confirm that there are no more invalid tracks in the corresponding cylinder. This is because a set cylinder bit indicates that there exists at least one invalid track in the cylinder. It does not indicate how many invalid tracks there might be in that cylinder.

Figure 3:
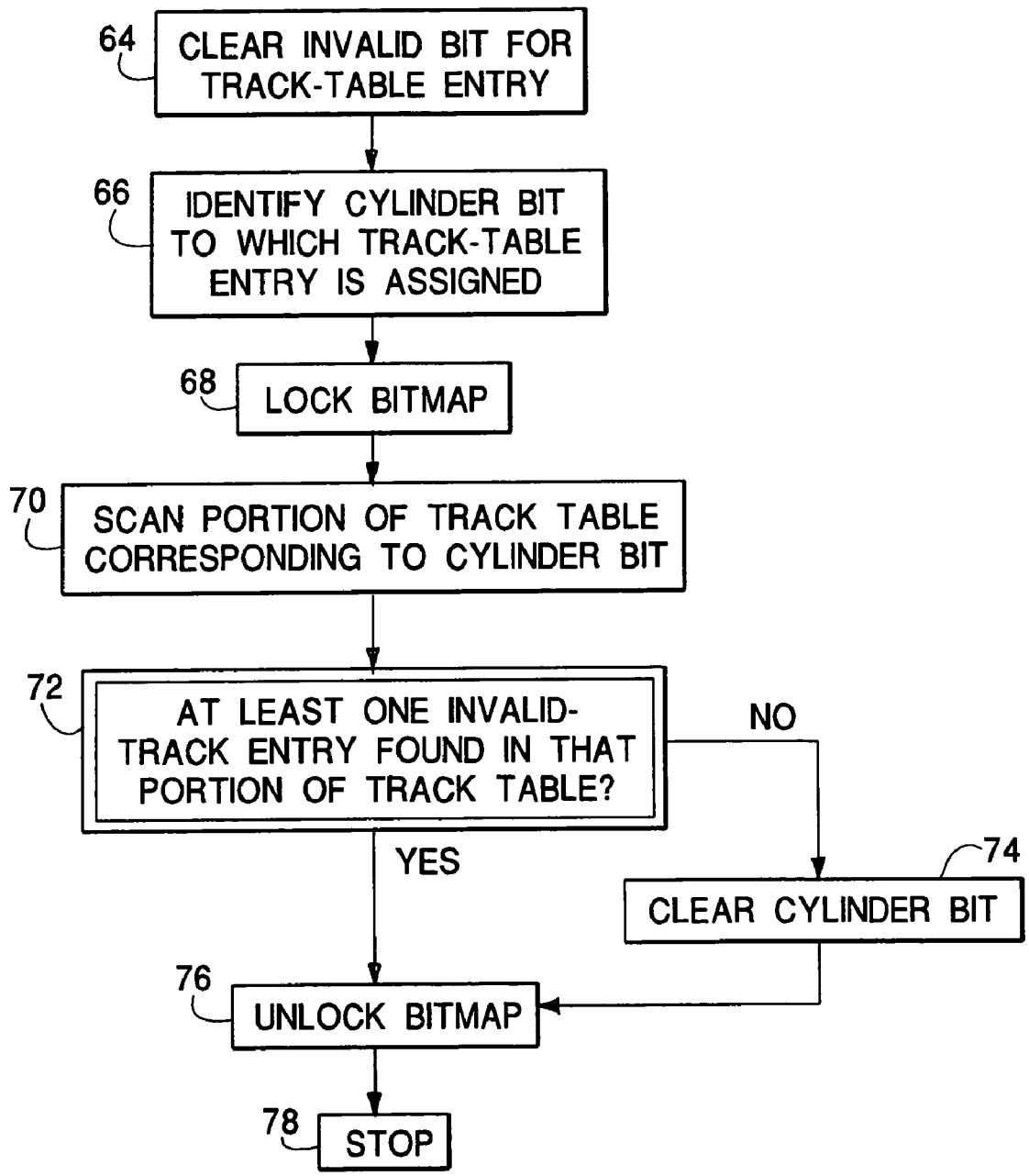
FIG. 3 is a flow-chart of a process for selectively clearing a cylinder bit from the shared memory of FIG. 1.

FIG. 3 shows the process carried out by the repair utility after having cleared the invalid bit in a particular track-table entry (step 64). The cylinder that contains the track whose invalid bit is to be cleared is identified (step 66) and the bitmap is locked to prevent any race condition from occurring (step 68). The invalid bits for all track-table entries in that portion of the track table that corresponds to that cylinder are then inspected (step 70). If no set invalid bits are detected in that portion of the track table (step 72), the cylinder bit is cleared (step 74) and the bitmap is unlocked (step 76). If a set invalid bit is detected (step 72), the cylinder bit remains set and the bitmap is unlocked (step 76). Once the bitmap is unlocked, the procedure stops (step 78).

The foregoing maintenance steps enable the data-storage to identify invalid tracks with fewer accesses to the shared memory. This benefit results from the distillation, into one cylinder bit in the bitmap, of status information concerning all tracks in a cylinder. As a result, the entire track table need not be scanned to identify invalid tracks. Instead, the much smaller bitmap is scanned, and only a limited portion of the track table need is scanned when a set cylinder bit is encountered in the bitmap.

Figure 4:
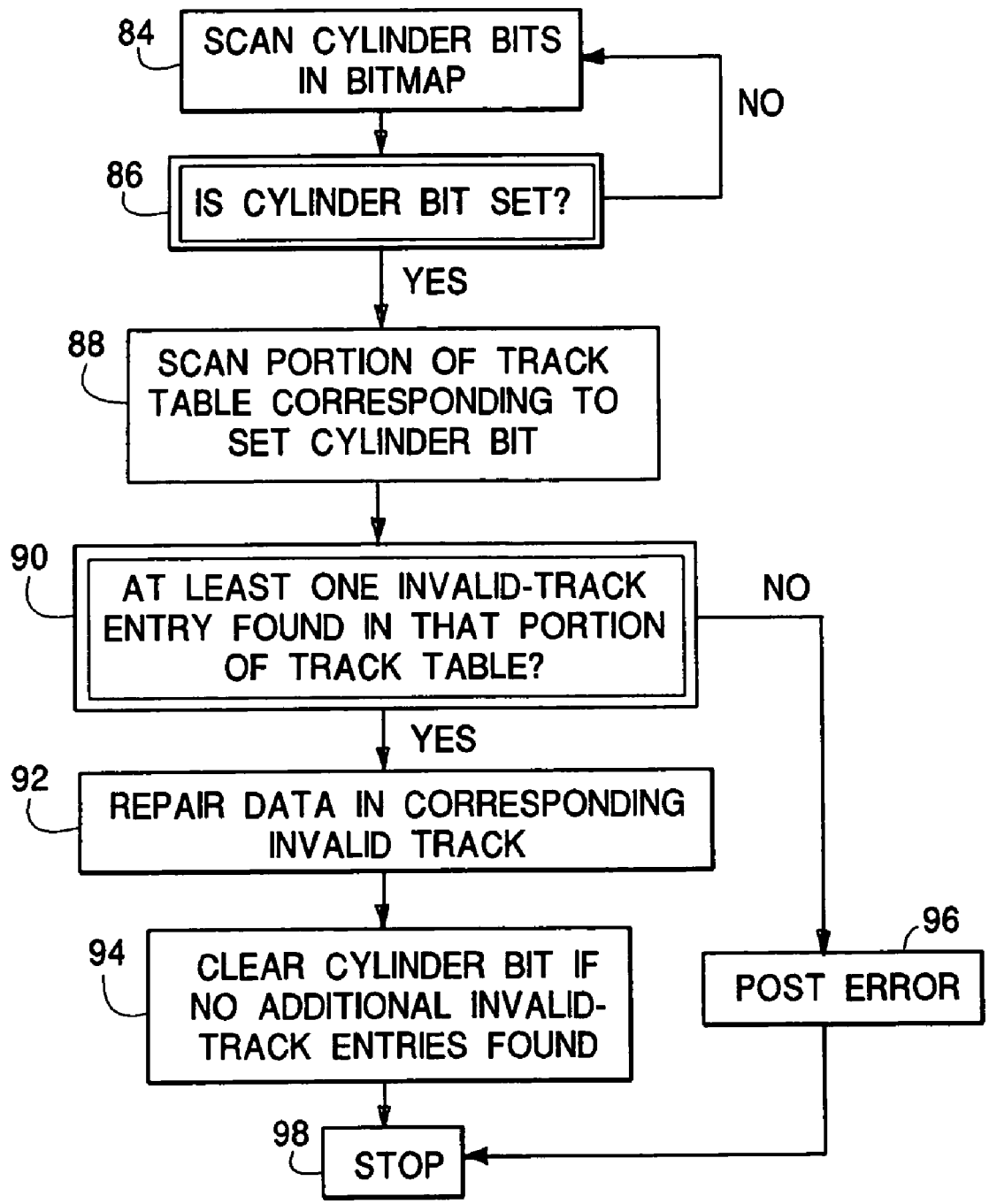
FIG. 4 is a flow-chart of a process for scanning the bitmap of FIG. 1 to identify cylinders with invalid-track entries.

FIG. 4 shows the manner in which the data-storage system identifies invalid tracks. The cylinder bits in the bitmap are periodically inspected (step 84) to determine whether there are any set cylinder bits (step 86). If a cylinder bit is clear, the next cylinder bit is inspected (step 84). Otherwise, that portion of the track table that corresponds to the cylinder represented by the cylinder bit is scanned to identify the particular invalid track (step 88). If an invalid-entry is found (step 90). When it does, the invalid data is corrected (step 92) and the cylinder bit is either cleared or not depending on the outcome of the procedure described in connection with FIG. 3 (step 94). In rare cases, a cylinder bit is set but no invalid-track entries are found (step 90). When this is the case, an error is posted (step 96).

FIG. 5 shows a particular algorithm, written as pseudocode, for updating the bitmap when an invalid track is identified. The cylinder bit corresponding to the invalid track is first identified (step 100). The integer "X" is a pointer to the first byte of the bitmap. The integer "O" is the offset, relative to the first byte of the bitmap, of the byte that contains the cylinder bit containing the invalid track. The integer "B" is the offset of the cylinder bit within that byte.

Once the byte containing the cylinder bit is identified, the bitmap is locked (step 102) so that other processes cannot modify it. Then, the byte that contains the cylinder bit is read into the integer D (step 104). If the cylinder bit indicates that there are no invalid tracks on the cylinder clear, it is changed to indicate that there is at least one invalid track in the cylinder (step 106). Then, the byte is written back into the bitmap (step 108) and the bitmap is unlocked (step 110). Otherwise, the cylinder bit is already set, in which case there is no need to write anything to the bitmap. In this case, the bitmap is simply unlocked (step 110).

FIG. 6 shows another algorithm for updating the bitmap, in this case after an invalid track (hereafter referred to as the "restored track") has been restored to being a valid track. In FIG. 6, the location of the cylinder bit that contains the restored track is identified in the same manner as in FIG. 5 (step 112). Once the byte containing the cylinder bit is identified, the bitmap is locked (step 114) so that other processes cannot modify it. Then, the byte that contains the cylinder bit is read into the integer D (step 116).

In this case, a set cylinder bit cannot be cleared until all tracks containing that are mapped to that cylinder bit are confirmed to be valid tracks. The illustrated procedure does this by setting a counter equal to the number of tracks in the cylinder (step 117), inspecting each track (step 118), and decrementing the counter each time a valid track is encountered (step 119). If at the end of this, the counter is zero, then all tracks on the cylinder must be valid (step 120), in which case the cylinder bit is cleared (step 121), the byte containing the cylinder bit is written back into the bitmap (step 122), and the bitmap is unlocked (step 123). If the cylinder bit is already clear going into this procedure, then it follows that there should have been no invalid tracks in the cylinder. Under these circumstances, it is troubling that this procedure, which is called only after an invalid track is restored, was ever called to begin with. Because of this inconsistency, the procedure posts an error (step 124).

FIG. 7 shows an algorithm for identifying invalid tracks. The process begins with identifying the next track following the most recently identified invalid track (step 126). The byte and offset for the cylinder bit associated with the next track is then identified in the same manner as discussed in connection with FIG. 5 (step 128).

If the entire byte containing the cylinder bit is clear, then there are no invalid tracks in any of the eight cylinders encompassed by the cylinder bits in that byte. In that case, the procedure skips over all 120 (8*15) tracks mapped to the eight bits in that byte (step 129).

However, if the byte includes at least one non-zero cylinder bit (step 130), the cylinder bits in that byte are inspected to identify the particular cylinder having the invalid track (step 132). Each track-table entry for that particular cylinder is then inspected to determine whether it is an invalid-track entry (step 134). The track number for the first invalid-track entry encountered is returned by the procedure (step 136). The procedure then moves to the next track (step 138). Note that since all fifteen tracks in the particular cylinder have just been inspected, the next track is actually offset by the number of tracks mapped to a cylinder bit (fifteen).

In the embodiment described herein, status information concerning tracks is distilled by grouping the tracks by cylinder and setting a bit corresponding to each cylinder. However, other groupings are possible. For example, if invalid tracks occur more frequently, it may be useful to assign less than a cylinder's worth of tracks to each bit in the bitmap. If invalid tracks occur less frequently, it may be useful to assign more than one cylinder's worth of tracks to each bit.

Additionally, the units of data storage need not be cylinders and tracks. For example, the bits in the bitmap may represent collections of blocks and the bits would then be set if any block in the collection of blocks is invalid.

More generally, the method described herein achieves savings in time and system resources by grouping elementary data storage elements into data storage units that include two or more such data storage elements. In the implementation described herein, the data storage unit is the cylinder and the data storage element is a track. However, any grouping of data storage elements into data storage units is within the scope of the invention.

The method described herein uses two layers of a data storage hierarchy. However, there is no reason the method cannot be extended to include multiple layers of a data storage hierarchy. For example, there may be a second bitmap in which each bit corresponds to one byte of the bitmap shown in FIG. 1. This second bitmap would then be scanned first. If a set bit is found in the second bitmap, the corresponding byte from the bitmap shown in FIG. 1 is scanned until the set cylinder bit is found, as already described in connection with FIG. 3. An implementation of this type is also within the scope of the invention.

Having described the invention, and a preferred embodiment thereof, what we claim as new and secured by Letters Patent is:

1. A data-storage system comprising:
   a data storage unit that includes at least two constituent data storage elements, each of said constituent data storage elements being in one of a first state and a second state other than said first state wherein said data storage unit comprises a cylinder and said constituent data storage elements comprise tracks included in said cylinder;
   a memory element configured to hold a data structure having an entry corresponding to said data storage unit, said entry including status information indicating whether at least one constituent data storage element of said data storage unit is in said first state,
   wherein said data structure comprises a bit map having a plurality of bits, each of which corresponds to a cylinder, each bit having a first state indicating that at least one track in said cylinder includes invalid data and a second state indicating that no tracks in said cylinder include invalid data.

2. The data-storage system of claim 1, further comprising a lock for locking said data structure to prevent modification of said status information.

3. The data-storage system of claim 1, wherein said first state indicates the presence of invalid data on said track.

4. In a data-storage system having a data storage unit that includes at least two constituent data storage elements, each of said constituent data storage elements being in one of a first state and a second state other than said first state, a method comprising:
   providing a data structure having an entry corresponding to said data storage unit, said entry including status information indicating whether at least one constituent data storage element of said data storage unit is in said first state;

locking said data structure before modifying said status information;

updating said entry following a change in state of at least one of said constituent data storage elements, wherein updating said entry comprises:

identifying an entry in said data structure corresponding to a data storage unit that includes a constituent data storage element in said first state; and modifying status information in said entry to indicate that said data storage unit includes at least one constituent data storage element in said first state; and unlocking said data structure after modifying said status information.

5. In a data-storage system having a data storage unit that includes at least two constituent data storage elements, each of said constituent data storage elements being in one of a first state and a second state other than said first state, a method comprising:

providing a data structure having an entry corresponding to said data storage unit, said entry including status information indicating whether at least one constituent data storage element of said data storage unit is in said first state; and updating said entry following a change in state of at least one of said constituent data storage elements wherein updating said entry comprises:

identifying an entry in said data structure corresponding to a data storage unit that includes a constituent data storage element in said first state; and modifying status information in said entry to indicate that said data storage unit includes at least one constituent data storage element in said first state;

wherein modifying status information comprises inspecting said status information to determine if said status information already indicates that at least one constituent data storage element is in said first state.

6. The method of claim 5, further comprising locking said data structure before modifying status information and unlocking said data structure after modifying status information.

7. The method of claim 5, wherein updating said entry comprises:

detecting that a constituent data storage element is in said second state;

determining whether said data storage unit contains any constituent data storage element in said first state;

identifying an entry in said data structure corresponding to a data storage unit that includes said constituent data storage element;

modifying status information in said entry to indicate that no constituent data storage elements of said data storage unit are in said first state.

8. The method of claim 7, further comprising locking said data structure before modifying status information and unlocking said data structure after modifying status information.

9. The method of claim 7, wherein modifying status information comprises inspecting said status information to determine if said status information already indicates that all constituent data storage elements are in said second state.

10. The method of claim 5, further comprising selecting said data storage unit to be a cylinder and selecting said constituent data storage elements to be tracks included in said cylinder.

11. The method of claim 10, further comprising selecting said first state to indicate the presence of invalid data on said track.

12. The method of claim 10, wherein providing a data structure comprises providing a bit map having a plurality of bits, each of which corresponds to a cylinder, each bit having a first state indicating that at least one track in said cylinder includes invalid data and a second state indicating that no tracks in said cylinder include invalid data.

13. The method of claim 5, further comprising scanning said data structure to locate constituent data storage elements in said first state.

14. The method of claim 13, wherein scanning said data structure comprises:

detecting an entry in said data structure that indicates the presence, in said data storage unit associated with said data structure, of at least one constituent data storage element in said first state; and scanning constituent data storage elements included in said data storage unit to identify said constituent data storage element in said first state.

15. In a data-storage system having a data storage unit that includes at least two constituent data storage elements, each of said constituent data storage elements being in one of a first state and a second state other than said first state, a method comprising:

providing a data structure having an entry corresponding to said data storage unit, said entry including status information indicating whether at least one constituent data storage element of said data storage unit is in said first state; and locking said data structure before modifying status information;

updating said entry following a change in state of at least one of said constituent data storage elements; wherein updating said entry comprises:

detecting that a constituent data storage element is in said second state;

determining whether said data storage unit contains any constituent data storage element in said first state;

identifying an entry in said data structure corresponding to a data storage unit that includes said constituent data storage element;

modifying status information in said entry to indicate that no constituent data storage elements of said data storage unit are in said first state; and unlocking said data structure after modifying said status information.

16. In a data-storage system having a data storage unit that includes at least two constituent data storage elements, each of said constituent data storage elements being in one of a first state and a second state other than said first state, a method comprising:

providing a data structure having an entry corresponding to said data storage unit, said entry including status information indicating whether at least one constituent data storage element of said data storage unit is in said first state; and updating said entry following a change in state of at least one of said constituent data storage elements; wherein updating said entry comprises:

detecting that a constituent data storage element is in said second state;

determining whether said data storage unit contains any constituent data storage element in said first state;

identifying an entry in said data structure corresponding to a data storage unit that includes said constituent data storage element; and modifying status information in said entry to indicate that no constituent data storage elements of said data storage unit are in said first state;

wherein modifying status information comprises inspecting said status information to determine if said status information already indicates that all constituent data storage elements are in said second state.

17. The method of claim 16, wherein updating said entry comprises:

identifying an entry in said data structure corresponding to a data storage unit that includes a constituent data storage element in said first state;

modifying status information in said entry to indicate that said data storage unit includes at least one constituent data storage element in said first state.

18. The method of claim 17, further comprising locking said data structure before modifying status information and unlocking said data structure after modifying status information.

19. The method of claim 17, wherein modifying status information comprises inspecting said status information to determine if said status information already indicates that at least one constituent data storage element is in said first state.

20. The method of claim 16, further comprising locking said data structure before modifying status information and unlocking said data structure after modifying status information.

21. The method of claim 16, further comprising selecting said data storage unit to be a cylinder and selecting said constituent data storage elements to be tracks included in said cylinder.

22. The method of claim 21, further comprising selecting said first state to indicate the presence of invalid data on said track.

23. The method of claim 21, wherein providing a data structure comprises providing a bit map having a plurality of bits, each of which corresponds to a cylinder, each bit having a first state indicating that at least one track in said cylinder includes invalid data and a second state indicating that no tracks in said cylinder include invalid data.

24. The method of claim 16, further comprising scanning said data structure to locate constituent data storage elements in said first state.

25. The method of claim 24, wherein scanning said data structure comprises:

detecting an entry in said data structure that indicates the presence, in said data storage unit associated with said data structure, of at least one constituent data storage element in said first state; and scanning constituent data storage elements included in said data storage unit to identify said constituent data storage element in said first state.

26. In a data-storage system having a data storage unit that includes at least two constituent data storage elements, each of said constituent data storage elements being in one of a first state and a second state other than said first state, a method comprising:

providing a data structure having an entry corresponding to said data storage unit, said entry including status information indicating whether at least one constituent data storage element of said data storage unit is in said first state;

updating said entry following a change in state of at least one of said constituent data storage elements;

selecting said data storage unit to be a cylinder and selecting said constituent data storage elements to be tracks included in said cylinder wherein providing a data structure comprises providing a bit map having a plurality of bits, each of which corresponds to a cylinder, each bit having a first state indicating that at least one track in said cylinder includes invalid data and a second state indicating that no tracks in said cylinder include invalid data.

27. A computer-readable medium having software for execution in a data-storage system having a data storage unit that includes at least two constituent data storage elements, each of said constituent data storage elements being in one of a first state and a second state other than said first state, said software comprising instructions for:

providing a data structure having an entry corresponding to said data storage unit, said entry including status information indicating whether at least one constituent data storage element of said data storage unit is in said first state;

locking said data structure before modifying status information;

updating said entry following a change in state of at least one of said constituent data storage elements wherein said instructions for updating said entry comprise instructions for:

identifying an entry in said data structure corresponding to a data storage unit that includes a constituent data storage element in said first state;

modifying status information in said entry to indicate that said data storage unit includes at least one constituent data storage element in said first state; and unlocking said data structure after modifying status information.

28. A computer-readable medium having software for execution in a data-storage system having a data storage unit that includes at least two constituent data storage elements, each of said constituent data storage elements being in one of a first state and a second state other than said first state, said software comprising instructions for:

providing a data structure having an entry corresponding to said data storage unit, said entry including status information indicating whether at least one constituent data storage element of said data storage unit is in said first state; and updating said entry following a change in state of at least one of said constituent data storage elements wherein said instructions for updating said entry comprise instructions for:

identifying an entry in said data structure corresponding to a data storage unit that includes a constituent data storage element in said first state; and modifying status information in said entry to indicate that said data storage unit includes at least one constituent data storage element in said first state;

wherein said instructions for modifying status information comprise instructions for inspecting said status information to determine if said status information already indicates that at least one constituent data storage element is in said first state.

29. The computer-readable medium of claim 28, wherein said software further comprises instructions for locking said data structure before modifying status information and unlocking said data structure after modifying status information.

30. The computer-readable medium of claim 28, wherein said instructions for updating said entry comprise instructions for:
  detecting that a constituent data storage element is in said second state;
  determining whether said data storage unit contains any constituent data storage element in said first state;
  identifying an entry in said data structure corresponding to a data storage unit that includes said constituent data storage element;
  modifying status information in said entry to indicate that no constituent data storage elements of said data storage unit are in said first state.

31. The computer-readable medium of claim 30, wherein said software further comprises instructions for locking said data structure before modifying status information and unlocking said data structure after modifying status information.

32. The computer-readable medium of claim 30, wherein said instructions for modifying status information comprise instructions for inspecting said status information to determine if said status information already indicates that all constituent data storage elements are in said second state.

33. The computer-readable medium of claim 28, wherein said software further comprises instructions for selecting said data storage unit to be a cylinder and selecting said constituent data storage elements to be tracks included in said cylinder.

34. The computer-readable medium of claim 33, wherein said software further comprises instructions for selecting said first state to indicate the presence of invalid data on said track.

35. The computer-readable medium of claim 33, wherein said instructions for providing a data structure comprise instructions for providing a bit map having a plurality of bits, each of which corresponds to a cylinder, each bit having a first state indicating that at least one track in said cylinder includes invalid data and a second state indicating that no tracks in said cylinder include invalid data.

36. The computer-readable medium of claim 28, wherein said software further comprises instructions for scanning said data structure to locate constituent data storage elements is said first state.

37. The computer-readable medium of claim 28, wherein said instructions for scanning said data structure comprise instructions for:
  detecting an entry in said data structure that indicates the presence, in said data storage unit associated with said data structure, of at least one constituent data storage element in said first state; and
  scanning constituent data storage elements included in said data storage unit to identify said constituent data storage element in said first state.

38. A computer-readable medium having software for execution in a data-storage system having a data storage unit that includes at least two constituent data storage elements, each of said constituent data storage elements being in one of a first state and a second state other than said first state, said software comprising instructions for:
  providing a data structure having an entry corresponding to said data storage unit, said entry including status information indicating whether at least one constituent data storage element of said data storage unit is in said first state;
  locking said data structure before modifying status information and unlocking said data structure after modifying status information; and
  updating said entry following a change in state of at least one of said constituent data storage elements; wherein said instructions for updating said entry comprise instructions for:
    detecting that a constituent data storage element is in said second state;
    determining whether said data storage unit contains any constituent data storage element in said first state;
    identifying an entry in said data structure corresponding to a data storage unit that includes said constituent data storage element; and
    modifying status information in said entry to indicate that no constituent data storage elements of said data storage unit are in said first state.

39. A computer-readable medium having software for execution in a data-storage system having a data storage unit that includes at least two constituent data storage elements, each of said constituent data storage elements being in one of a first state and a second state other than said first state, said software comprising instructions for:
  providing a data structure having an entry corresponding to said data storage unit, said entry including status information indicating whether at least one constituent data storage element of said data storage unit is in said first state; and
  updating said entry following a change in state of at least one of said constituent data storage elements
  wherein said instructions for updating said entry comprise instructions for:
    detecting that a constituent data storage element is in said second state;
    determining whether said data storage unit contains any constituent data storage element in said first state;
    identifying an entry in said data structure corresponding to a data storage unit that includes said constituent data storage element; and
    modifying status information in said entry to indicate that no constituent data storage elements of said data storage unit are in said first state; and
  wherein said instructions for modifying status information comprise instructions for inspecting said status information to determine if said status information already indicates that all constituent data storage elements are in said second state.

40. The computer-readable medium of claim 39, wherein said instructions for updating said entry comprise instructions for:
  identifying an entry in said data structure corresponding to a data storage unit that includes a constituent data storage element in said first state;
  modifying status information in said entry to indicate that said data storage unit includes at least one constituent data storage element in said first state.

41. The computer-readable medium of claim 40, wherein said software further comprises instructions for locking said data structure before modifying status information and unlocking said data structure after modifying status information.

42. The computer-readable medium of claim 40, wherein said instructions for modifying status information comprise instructions for inspecting said status information to determine if said status information already indicates that at least one constituent data storage element is in said first state.

43. The computer-readable medium of claim 39, wherein said software further comprises instructions for locking said data structure before modifying status information and unlocking said data structure after modifying status information.

44. The computer-readable medium of claim 39, wherein said software further comprises instructions for selecting said data storage unit to be a cylinder and selecting said constituent data storage elements to be tracks included in said cylinder.

45. The computer-readable medium of claim 44, wherein said software further comprises instructions for selecting said first state to indicate the presence of invalid data on said track.

46. The computer-readable medium of claim 44, wherein said instructions for providing a data structure comprise instructions for providing a bit map having a plurality of bits, each of which corresponds to a cylinder, each bit having a first state indicating that at least one track in said cylinder includes invalid data and a second state indicating that no tracks in said cylinder include invalid data.

47. The computer-readable medium of claim 39, wherein said software further comprises instructions for scanning said data structure to locate constituent data storage elements in said first state.

48. A computer-readable medium having software for execution in a data-storage system having a data storage unit that includes at least two constituent data storage elements, each of said constituent data storage elements being in one of a first state and a second state other than said first state, said software comprising instructions for:

providing a data structure having an entry corresponding to said data storage unit, said entry including status information indicating whether at least one constituent data storage element of said data storage unit is in said first state;

updating said entry following a change in state of at least one of said constituent data storage elements;

selecting said data storage unit to be a cylinder and selecting said constituent data storage elements to be tracks included in said cylinder wherein said instructions for providing a data structure comprise instructions for providing a bit map having a plurality of bits, each of which corresponds to a cylinder, each bit having a first state indicating that at least one track in said cylinder includes invalid data and a second state indicating that no tracks in said cylinder include invalid data.

\* \* \* \* \*

UNITED STATES PATENT AND TRADEMARK OFFICE
CERTIFICATE OF CORRECTION

PATENT NO. : 7,406,574 B1  
APPLICATION NO. : 10/081682  
DATED : July 29, 2008  
INVENTOR(S) : Amnon Naamad Page 1 of 1

It is certified that error appears in the above-identified patent and that said Letters Patent is hereby corrected as shown below:

In claim 36 at col. 11, line 41, replace "is" with --in--. The corrected claim reads as follows:

36. The computer-readable medium of claim 28, wherein said software further comprises instructions for scanning said data structure to locate constituent data storage elements in said first state.

Signed and Sealed this

Second Day of June, 2009

JOHN DOLL  
*Acting Director of the United States Patent and Trademark Office*